United States Patent
Nozawa (10) Patent No.: US 12,525,893 B2
(45) Date of Patent: Jan. 13, 2026

(54) POWER CONVERTER FOR CONVERTING BETWEEN DIRECT CURRENT AND ALTERNATING CURRENT

(71) Applicant: TOYOTA JIDOSHA KABUSHIKI KAISHA, Toyota (JP)

(72) Inventor: Takashi Nozawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 232 days.

(21) Appl. No.: 18/222,631

(22) Filed: Jul. 17, 2023

(65) Prior Publication Data
US 2024/0106343 A1 Mar. 28, 2024

(30) Foreign Application Priority Data
Sep. 28, 2022 (JP) .................. 2022-154992

(51) Int. Cl.
*H02M 7/217* (2006.01)
*H02M 1/00* (2006.01)

(52) U.S. Cl.
CPC ......... *H02M 7/217* (2013.01); *H02M 1/0009* (2021.05)

(58) Field of Classification Search
CPC ............................ H02M 7/217; H02M 1/0009
USPC .............................................. 363/89
See application file for complete search history.

(56) References Cited

U.S. PATENT DOCUMENTS

| 7,889,524 B2* | 2/2011 | Lee | B60L 53/24 363/124 |
| 8,482,255 B2* | 7/2013 | Crombez | H01M 10/44 320/132 |
| 2013/0200846 A1* | 8/2013 | Ang | B60L 1/003 320/109 |
| 2014/0028256 A1* | 1/2014 | Sugiyama | B60L 53/22 320/109 |
| 2023/0327573 A1* | 10/2023 | Tagawa | H02M 7/219 318/504 |

FOREIGN PATENT DOCUMENTS

| EP | 3092149 B1 * | 7/2020 | ............ B60L 58/18 |
| EP | 4228140 A1 * | 8/2023 | ......... H02M 1/0006 |
| JP | 2017-135890 A | 8/2017 | |
| WO | 2012/144045 A1 | 10/2012 | |

* cited by examiner

*Primary Examiner* — Yemane Mehari
(74) *Attorney, Agent, or Firm* — Sughrue Mion, PLLC (57) ABSTRACT

The power converter includes a first connection unit to which a DC power source is connected, a second connection unit to which an AC power source or a power consuming device is connected, a conversion unit that performs power conversion between the first connection unit and the second connection unit, and a control unit that controls an operation of the conversion unit. The control unit performs both AC control for controlling the operation of the conversion unit so that the input or output of AC power is performed in the second connection unit, and DC control for controlling the operation of the conversion unit so that the output of DC power is performed in the second connection unit.

9 Claims, 10 Drawing Sheets

POWER CONVERTER FOR CONVERTING BETWEEN DIRECT CURRENT AND ALTERNATING CURRENT

CROSS-REFERENCE TO RELATED APPLICATION

This application claims priority to Japanese Patent Application No. 2022-154992 filed on Sep. 28, 2022, incorporated herein by reference in its entirety.

BACKGROUND

1. Technical Field

The present disclosure relates to a power converter.

2. Description of Related Art

As described in WO2012/144045, an electrified vehicle is provided with, for example, a power converter for performing power conversion between an external power supply and a storage battery. The power converter makes it possible to convert alternating current power supplied from the external power supply into direct current power and supply the direct current power to the storage battery, convert the direct current power supplied from the storage battery into the alternating current power and output the alternating current power to the outside, and the like.

SUMMARY

The power converter configured to perform direct current/alternating current (DC/AC) conversion as described in WO 2012/144045 includes a first connection unit to which a direct current power supply such as the storage battery is connected and a second connection unit to which an alternating current power consuming device, an alternating current power supply, or the like is connected, for example. In such a conventional configuration, the alternating current power can be output from the second connection unit, but the direct current power cannot be output from the second connection unit. Therefore, for example, in an electrified vehicle, in order to supply the direct current power to a heater for an electrically heated catalyst (EHC), a power converter configured to perform direct current/direct current (DC/DC) conversion needs to be separately provided, which results in an increase of cost. Although it is also possible to supply the alternating current power to the heater, in this case, the energy efficiency is lowered, and noise increases with the output of the alternating current power.

An object of the present disclosure is to provide a power converter capable of performing both the DC/AC conversion and the DC/DC conversion with a simple configuration.

A power converter according to the present disclosure includes:
 a first connection unit to which a direct current power supply is connected;
 a second connection unit to which an alternating current power supply or a power consuming device is connected;
 a conversion unit for converting power between the first connection unit and the second connection unit; and
 a control unit for controlling an operation of the conversion unit.

The control unit performs both
 alternating current control for controlling the operation of the conversion unit such that alternating current power is input or output in the second connection unit, and
 direct current control for controlling the operation of the conversion unit such that direct current power is output in the second connection unit.

In the power converter having such a configuration, only by changing a mode of control performed by the control unit with respect to the conversion unit, it is possible to switch between control in which the alternating current power is input or output in the second connection unit (i.e., DC/AC conversion) and control in which the direct current power is output in the second connection unit (i.e., DC/DC conversion).

According to the present disclosure, the power converter capable of performing both the DC/AC conversion and the DC/DC conversion with a simple configuration is provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, the present embodiment will be described with reference to the accompanying drawings. In order to facilitate understanding of the description, the same components are denoted by the same reference numerals as much as possible in the drawings, and redundant description will be omitted.

Figure 1:
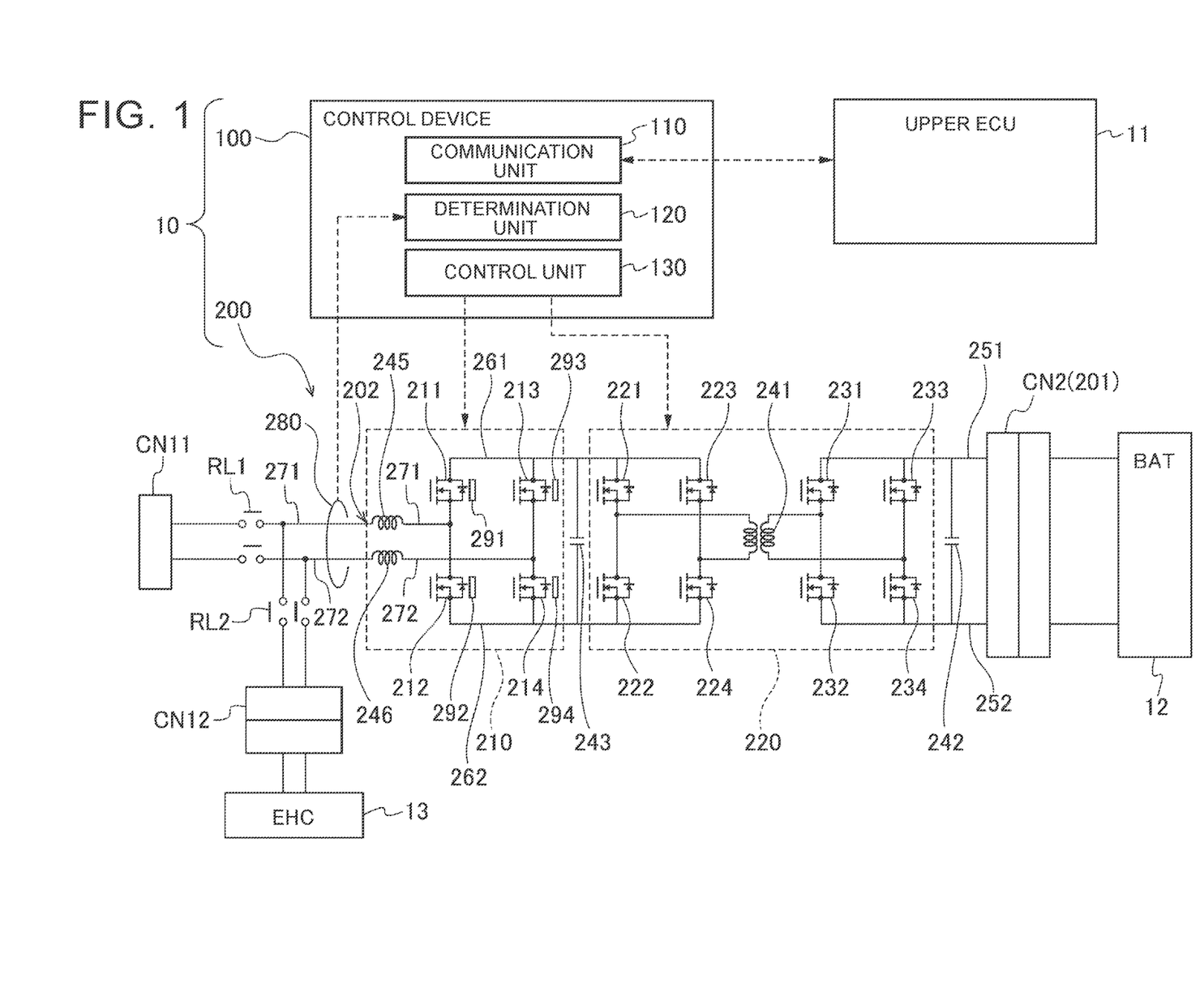
FIG. 1 is a diagram schematically illustrating an overall configuration of a power converter according to a first embodiment.

A first embodiment is described. The power converter 10 according to the present embodiment is a device mounted on an electrified vehicle (not shown). Electrified vehicle includes a storage battery 12 and a rotating electric machine (not shown), and generates a driving force required for traveling by supplying electric power stored in the storage battery 12 to the rotating electric machine. The power converter 10 converts DC power supplied from the storage battery 12 into AC power, and supplies the AC power to the rotary electric machine.

As illustrated in FIG. 1, the power converter 10 includes a control device 100 and a conversion unit 200. The control device 100 is a device that controls the operation of the power converter 10 including the conversion unit 200. The conversion unit 200 is a circuit configured to perform power conversion such as DC/AC conversion.

First, the configuration of the conversion unit 200 will be described. The conversion unit 200 includes a connector CN11, CN12, CN2, a first conversion unit 210, and a second conversion unit 220.

The connector CN11 is a connector configured as a part that receives AC power from the outside. For example, a wire connected to AC inlet of electrified vehicle is connected to the connector CN11. When AC power is supplied from AC inlet to electrified vehicle, the power is converted into DC power by the power converter 10 and stored in the storage battery 12.

The connector CN12 is a connector configured as a part for outputting DC power. A wire connected to a power consuming device mounted on electrified vehicle is connected to the connector CN12. The power consuming device is a device that operates by receiving an operation of DC power from the power converter 10. In the present embodiment, the heater 13 for heating electrically heated catalyst (EHC) is connected as the power consuming device.

As shown in FIG. 1, a pair of wires 271 and 272 extend from the first conversion unit 210 of the power converter 10, and the wires are branched in the middle. The pair of branched wires is connected to the connector CN11, and the other pair of wires is connected to the connector CN12. In the middle of the wire connected to the connector CN11, a relay RL1 is provided. Similarly, a relay RL2 is provided in the middle of the wire connected to the connector CN12. An operation of each relay RL1, RL2 is controlled by the control device 100.

As will be described later, the conversion unit 200 can perform an operation of receiving AC power from the wires 271 and 272 and an operation of outputting DC power from the same wires 271 and 272. When the conversion unit 200 operates to receive the AC power, the relay RL1 is closed, the relay RL2 is opened, and the AC power is supplied from the connector CN11 via the wires 271 and 272. When the conversion unit 200 operates to output DC power, the relay RL1 is opened, the relay RL2 is closed, and the DC power is output from the wires 271 and 272 via the connector CN12.

Note that the conversion unit 200 may also be configured to perform an operation of outputting AC power from the wires 271 and 272. When the conversion unit 200 operates to output AC power, the relay RL1 is closed, the relay RL2 is opened, and the AC power is output from the wires 271 and 272 via the connector CN11.

A portion of the first conversion unit 210 to which the wires 271 and 272 are connected from the outside is a portion to which an AC power supply located at the end of AC inlet and a power consuming device such as the heater 13 are electrically connected. The portion is also referred to as a "second connection unit 202". The second connection unit 202 may be configured as a detachable connector. In addition, only one of the AC power supply and the power consuming device may be connected to the second connection unit 202.

The connector CN2 is a connector configured as a part to which the storage battery 12, which is a DC power supply, is connected. The conversion unit 200 of the present embodiment is configured to be capable of performing both an operation of receiving DC power from the storage battery 12 from the connector CN2 and an operation of outputting DC power from the connector CN2 to charge the storage battery 12, but may be configured to be capable of performing only one of them. Further, the DC power source connected to the connector CN2 may be the storage battery 12 that can be charged and discharged as in the present embodiment, or may be a power source that can only be discharged. The connector CN2 to which the DC power supply is connected is hereinafter also referred to as "first connection unit 201". The conversion unit 200 may be referred to as a portion that performs power conversion between the first connection unit 201 and the second connection unit 202.

The first conversion unit 210 is a full bridge inverter circuitry configured to perform DC/AC conversion or the like between the second connection unit 202 and a second conversion unit 220 described later. The first conversion unit 210 includes four switching elements including a first switching element 211, a second switching element 212, a third switching element 213, and a fourth switching element 214 between the wire 261 and the wire 262. These are all N-channel Metal-Oxide-Semiconductor Filed Effect Transistor (MOSFET), and diodes are connected in parallel between the drain-source thereof.

The first switching element 211 and the second switching element 212 are connected in series between the wire 261 and the wire 262. Similarly, the third switching element 213 and the fourth switching element 214 are connected in series between the wire 261 and the wire 262.

The first switching element 211 and the third switching element 213 are disposed on the wire 261 and constitute an "upper arm" of full bridge inverter circuitry. The second switching element 212 and the fourth switching element 214 are disposed on the wire 262 and constitute a "lower arm" of full bridge inverter circuitry.

One end of the wire 271 is connected between the first switching element 211 and the third switching element 213. A smoothing reactor 245 is disposed in the middle of the wire 271. One end of the wire 272 is connected between the second switching element 212 and the fourth switching element 214. A smoothing reactor 246 is disposed in the middle of the wire 272.

The opening and closing operations of the first switching element 211, the second switching element 212, the third switching element 213, and the fourth switching element 214 are controlled by a control device 100 described later. The control device 100 can cause the first conversion unit 210 to perform DC/AC conversion by controlling the operation of the first switching element 211 and the like. Since a known method can be used as such control, a detailed description thereof will be omitted.

In addition, the control device 100 may control the operation of the first switching element 211 and the like, thereby causing the DC power to be outputted from the first conversion unit 210 toward the connector CN2. Details of the control will be described later.

The second conversion unit 220 is a circuit configured to perform DC/DC conversion between the first connection unit 201 (connector CN2) and the first conversion unit 210. In the second conversion unit 220, two full bridge inverter circuits are connected to each other via a transformer 241.

One full bridge inverter includes four switching elements 221, 222, 223, and 224. The switching elements 221, 222, 223, and 224 are disposed between a pair of wires 261 and 262 extending from the first conversion unit 210.

The switching element 221 and the switching element 222 are connected in series between the wire 261 and the wire 262. Similarly, the switching element 223 and the switching element 224 are connected in series between the wire 261 and the wire 262.

The switching elements 221 and 223 are disposed on the wire 261 side and constitute an "upper arm" of the full-bridge inverter circuit. The switching elements 222 and 224 are disposed on the wire 262 and constitute a "lower arm" of full bridge inverter circuitry.

One of the wires connected to the primary side of the transformer 241 is connected between the switching element 221 and the switching element 223, and the other of the wires connected to the primary side of the transformer 241 is connected between the switching element 222 and the switching element 224. The "primary side" described above refers to a "primary side" in a case where the conversion unit 200 performs a charging operation to the storage battery 12.

The other full bridge inverter of the second conversion unit 220 includes four switching elements 231, 232, 233, and 234. The switching elements 231, 232, 233, and 234 are disposed between a pair of wires 251 and 252 connected to the connector CN2.

The switching element 231 and the switching element 232 are connected in series between the wire 251 and the wire 252. Similarly, the switching element 233 and the switching element 234 are connected in series between the wire 251 and the wire 252.

The switching elements 231 and 233 are disposed on the wire 251 and constitute an "upper arm" of full bridge inverter circuitry. The switching elements 232 and 234 are disposed on the wire 252 and constitute a "lower arm" of full bridge inverter circuitry.

One of the wires connected to the secondary side of the transformer 241 is connected between the switching element 231 and the switching element 233, and the other of the wires connected to the secondary side of the transformer 241 is connected between the switching element 232 and the switching element 234. The "secondary side" described above refers to a "secondary side" in a case where the conversion unit 200 performs a charging operation to the storage battery 12.

The opening and closing operations of the switching elements 221, 222, 223, 224, 231, 232, 233, and 234 are controlled by the control device 100. The control device 100 can cause the second conversion unit 220 to perform DC/DC conversion by controlling the operation of the switching element 221 and the like. Since a known method can be used as such control, a detailed description thereof will be omitted.

Other configurations of the conversion unit 200 will be described. Between the first conversion unit 210 and the second conversion unit 220, a smoothing capacitor 243 is disposed in the middle of the wire connecting the wire 261 and the wire 262. Similarly, in the vicinity of the connector CN2, a smoothing capacitor 242 is disposed in the middle of the wire connecting the wire 251 and the wire 252.

The second connection unit 202 is provided with a ground fault detection unit 280. The ground fault detection unit 280 is a sensor for detecting a leakage occurring somewhere in the power path including the wires 271 and 272. In the present embodiment, Zero-phase Current Transformer (ZCT) is used as the ground fault detection unit 280. Therefore, the leakage detection by the ground fault detection unit 280 is possible only when the potential difference between the wire 271 and the wire 272 periodically fluctuates. The ground fault detection unit 280 transmits a signal indicating the detection result of the leakage to the control device 100. The control device 100 can grasp the presence or absence of an electric leakage and the magnitude thereof based on the signal.

The first conversion unit 210 is provided with four temperature sensors 291, 292, 293, and 294. Each of these is a sensor for detecting the temperature of the first switching element 211, the second switching element 212, the third switching element 213, and the fourth switching element 214, and specifically, a thermistor disposed in the vicinity of each of the first switching element 211 and the like. The temperature sensors 291, 292, 293, 294 transmit signals indicative of the measured temperature to the control device 100. The control device 100 can individually grasp the temperature of each of the first switching elements 211 and the like based on the signal. The temperature sensors 291, 292, 293, and 294 correspond to a "temperature detection unit" that detects the temperature of the conversion unit 200. The position where the temperature sensor 291 or the like is provided may be the same position as the first switching element 211 or the like, but may be a position away from the first switching element 211 or the like.

With continued reference to FIG. 1, the configuration of the control device 100 will be described. The control device 100 is configured as a computer system including Central Processing Unit (CPU), Read Only Memory (ROM), Random Access Memory (RAM), and the like. The control device 100 controls the operation of the power converter in response to a request from a host Electric Control Unit (ECU) 11 mounted on electrified vehicle. The control device 100 includes a communication unit 110, a determination unit 120, and a control unit 130 as elements representing the functions.

The communication unit 110 is a part serving as an interface for performing two-way communication with another device mounted on electrified vehicle. The control device 100 performs communication with a host ECU 11 via the communication unit 110, and performs a process of receiving a control signal from a host ECU 11.

The determination unit 120 is a portion that performs a process of determining the presence or absence of an electric leakage based on a signal output from the ground fault detection unit 280.

The control unit 130 is a unit that performs processing for controlling the operation of the conversion unit 200. The control unit 130 causes the conversion unit 200 to perform power conversion by individually controlling the opening and closing operations of the switching elements (the first switching element 211 and the like) provided in the conversion unit 200. As described above, in the power converter 10 of the present embodiment, in addition to performing DC/AC conversion in the conversion unit 200 and inputting and outputting AC power from the second connection unit 202, the conversion unit 200 performs DC/DC conversion and outputting DC power from the second connection unit 202. Control performed by the control unit 130 on the conversion unit 200 so that the AC power is input or output in the second connection unit 202 is also referred to as "AC control" hereinafter. Control performed by the control unit 130 on the conversion unit 200 so that the output of the DC power is performed in the second connection unit 202 is also referred to as "DC control" hereinafter. The control unit 130 can perform both AC control and DC control.

For example, when AC power is supplied from AC inlet to electrified vehicle, the storage battery 12 is charged by AC control. At this time, the control unit 130 causes the first switching element 211 and the like of the first conversion unit 210 to perform a switching operation, thereby causing the DC power to be output from the first conversion unit 210 to the second conversion unit 220. The control unit 130 further causes the switching element 221 or the like of the second conversion unit 220 to perform a switching operation, thereby causing the DC power to be output from the second conversion unit 220 to the storage battery 12. As a specific control method of each switching element in AC control, a known method can be adopted, and thus a detailed description thereof will be omitted.

A specific method of DC control is described. In the DC control, the control unit 130 controls the operation of the switching elements 221 and the like included in the second conversion unit 220 to cause the second conversion unit 220 to perform DC/DC conversion. As a result, a DC voltage is applied between the wire 261 and the wire 262.

Figure 2:
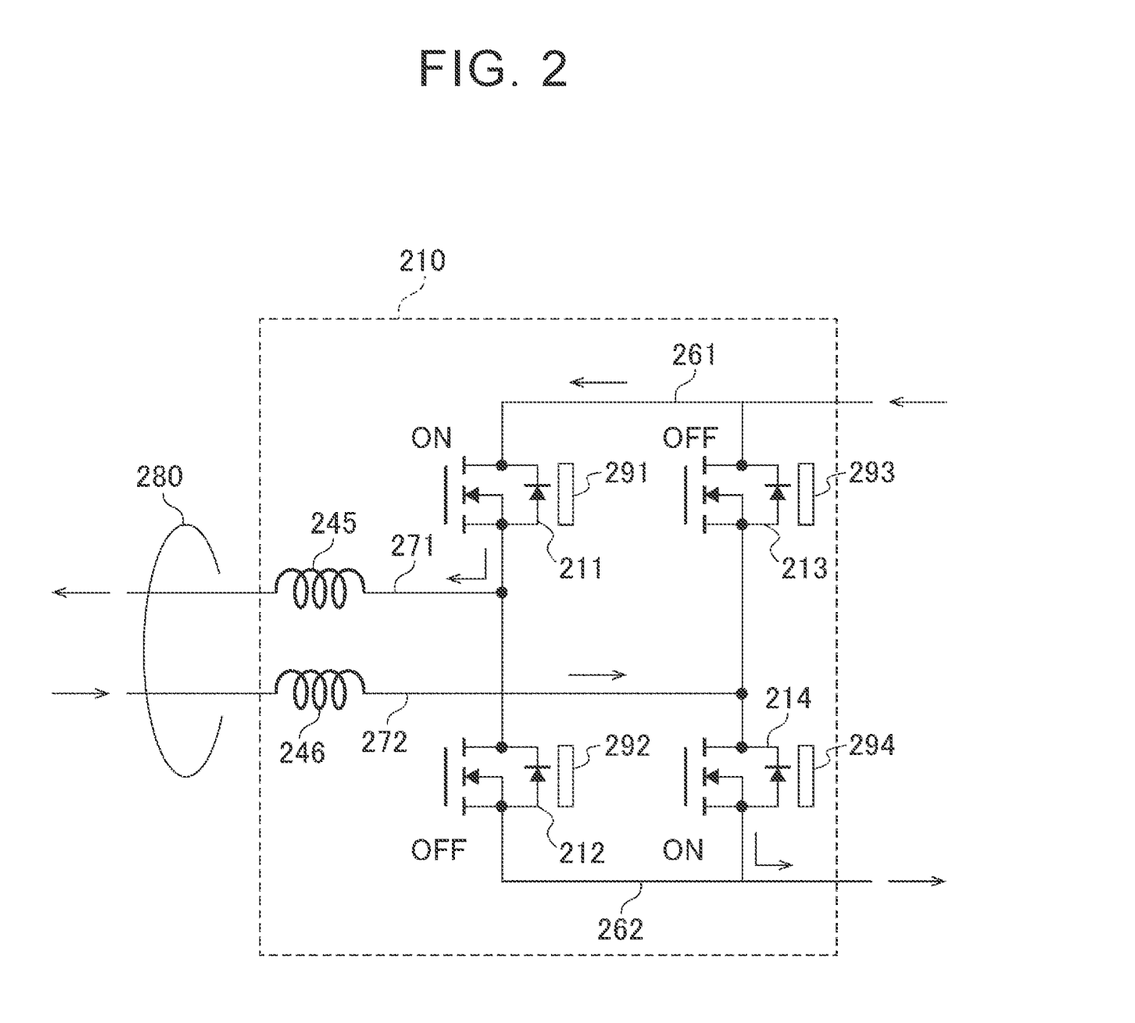
FIG. 2 is a diagram for explaining an operation of a conversion unit of the power converter according to the first embodiment.

The control unit 130 causes the second conversion unit 220 to perform DC/DC conversion as described above, and switches the states of the first switching elements 211 and the like included in the first conversion unit 210 as shown in FIG. 2. Specifically, the control unit 130 closes the first switching element 211 and the fourth switching element 214, and opens the second switching element 212 and the third switching element 213. As a result, a current flows in a path indicated by an arrow in FIG. 2, and DC power is supplied from the second connection unit 202 toward the heater 13.

Figure 3:
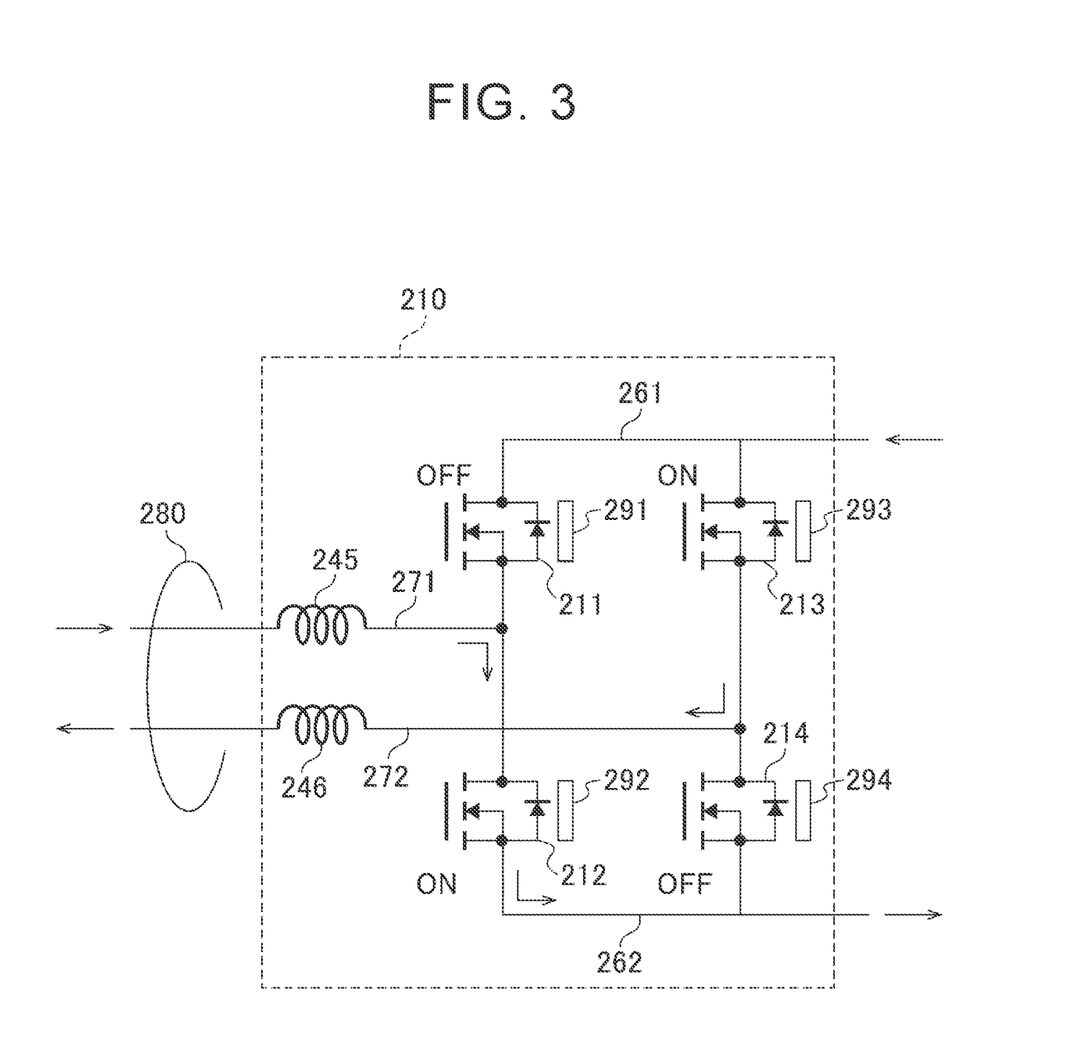
FIG. 3 is a diagram for explaining an operation of a conversion unit of the power converter according to the first embodiment.

In the DC control, the control unit 130 may switch the state of the first switching element 211 and the like included in the first conversion unit 210 as shown in FIG. 3 instead of FIG. 2. In the example of FIG. 3, the control unit 130 closes the second switching element 212 and the third switching element 213, and opens the first switching element 211 and the fourth switching element 214. In this case, as indicated by an arrow in FIG. 3, a current flows in a path opposite to the example of FIG. 2, and DC power is supplied from the second connection unit 202 toward the heater 13.

As described above, the DC control performed by the control unit 130 according to the present embodiment includes two types of control, namely, the control performed in the state shown in FIG. 2 and the control performed in the state shown in FIG. 3. The DC control in the state shown in FIG. 2 is hereinafter also referred to as "first DC control". The DC control in the state shown in FIG. 3 is hereinafter also referred to as "second DC control".

Figure 4:
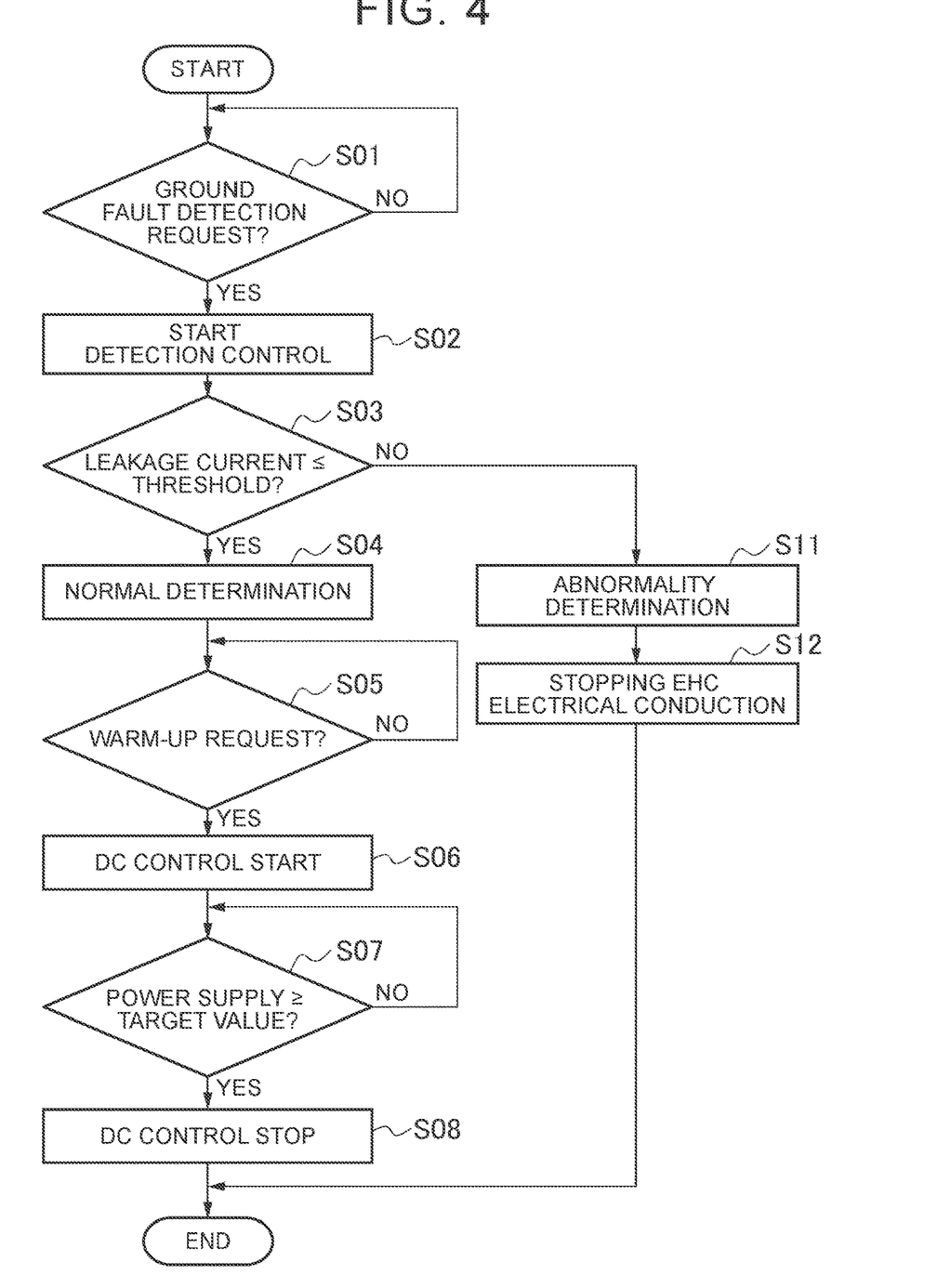
FIG. 4 is a flowchart illustrating a flow of processing executed by the control device in the first embodiment.

A specific flow of processing performed by the control device 100 in the DC control will be described with reference to FIG. 4. In the first S01 of the process, the control device 100 determines whether or not there is a leakage detecting demand. The "leakage detection request" is a request signal transmitted from the host ECU 11 to the control device 100 so as to cause the power converter 10 to perform a process of detecting a leakage current. In the present embodiment, the upper ECU 11 is configured to cause the power converter 10 to detect leakage prior to the DC control. Alternatively, the control device 100 may detect an electric leakage in advance (based on its own judgment) when an instruction to execute the DC control is given from the host ECU 11.

When the leakage detection request from the host ECU 11 has not yet arrived, the control device 100 repeatedly executes S01 process and waits until the leakage detection request arrives. When the fault detection-request arrives, the process proceeds to S02. In S02, the control unit 130 starts detecting control. The "detection control" is control for controlling the operation of the conversion unit 200 so that the potential difference between the pair of wires 271 and 272, which are paths through which electric power is input and output in the second connection unit 202, changes in a rectangular wave shape.

Figure 5:
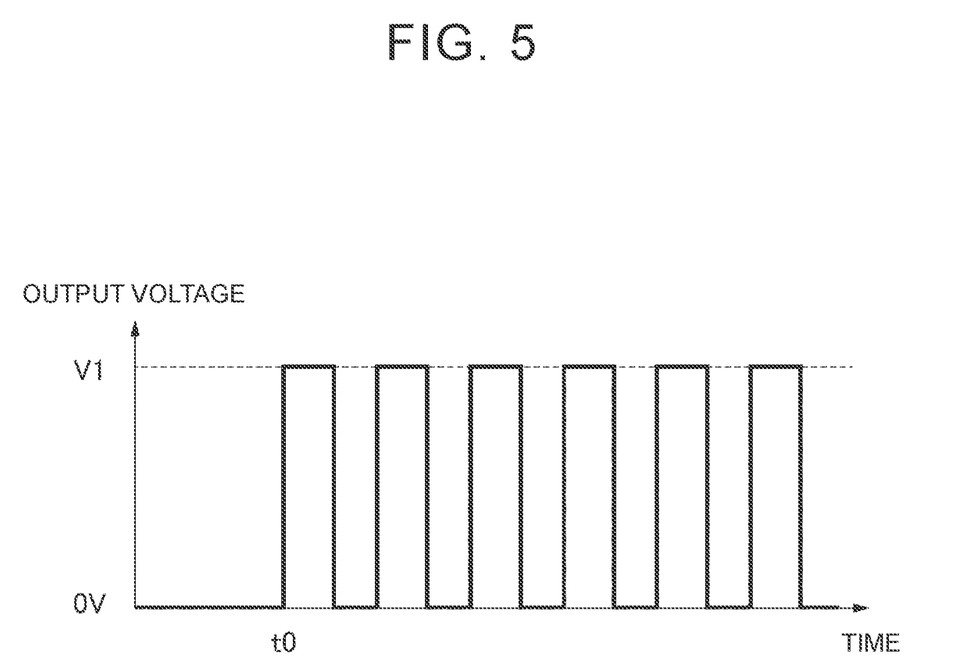
FIG. 5 is a diagram illustrating an example of a change in the output voltage at the second connection unit.

For example, when the first switching element 211 and the third switching element 213 are in the open state and the second switching element 212 and the fourth switching element 214 are in the closed state, the potential difference between the wires 271 and 272 becomes 0. In the detection control, the control unit 130 controls the operation of the first switching element 211 and the like so that the above-described state and the state of FIG. 2 are alternately switched. Consequently, as shown in FIG. 5, the potential difference between the wires 271 and 272 changes in a rectangular wave shape so as to alternately switch between the predetermined voltages V1 and 0V. The time t0 illustrated in FIG. 5 is a time at which the detecting control is started.

At this time, since the potential difference between the wire 271 and the wire 272 periodically fluctuates, the electric leakage can be detected by the ground fault detection unit 280. During the execution of the detection control, the ground fault detection unit 280 transmits a signal indicating the presence or absence of leakage in the power path and the magnitude of the leakage current to the control device 100. The determination unit 120 determines the presence or absence of an electric leakage based on a signal transmitted from the ground fault detection unit 280 during execution of the detection control. By executing the detection control, it is possible to detect an electric leakage while using a relatively inexpensive Zero-phase Current Transformer (ZCT) as the ground fault detection unit 280.

In the detection control, the control unit 130 may control the operation of the first switching element 211 or the like so that the state of FIG. 2 and the state of FIG. 3 are alternately switched.

Returning to FIG. 4, the description is continued. In S03 following S02, it is determined whether or not the magnitude of the leakage current detected by the ground fault detection unit 280 falls below a preset threshold.

If the leakage current exceeds the threshold, the process proceeds to S11. In S11, the determination unit 120 determines that an anomaly, that is, an electric leakage has occurred. In S12 following S11, the control unit 130 performs a process of stopping the energization of the heater 13. Thereafter, the series of processes shown in FIG. 4 is ended. By performing the above processing, it is possible to prevent a situation in which the power supply to the heater 13 is continued while the electric leakage is occurring.

In S03, if the leakage current falls below the threshold, the process proceeds to S04. In S04, the determination unit 120 determines that the current is normal, that is, no electric leakage occurs. Thereafter, the process proceeds to S05.

In S05, the control device 100 determines whether or not there is a warm-up request. The "warm-up request" refers to a request signal transmitted from the host ECU 11 to the control device 100 so that DC power is supplied to the heater 13 and electrically heated catalyst starts to be heated.

Figure 6:
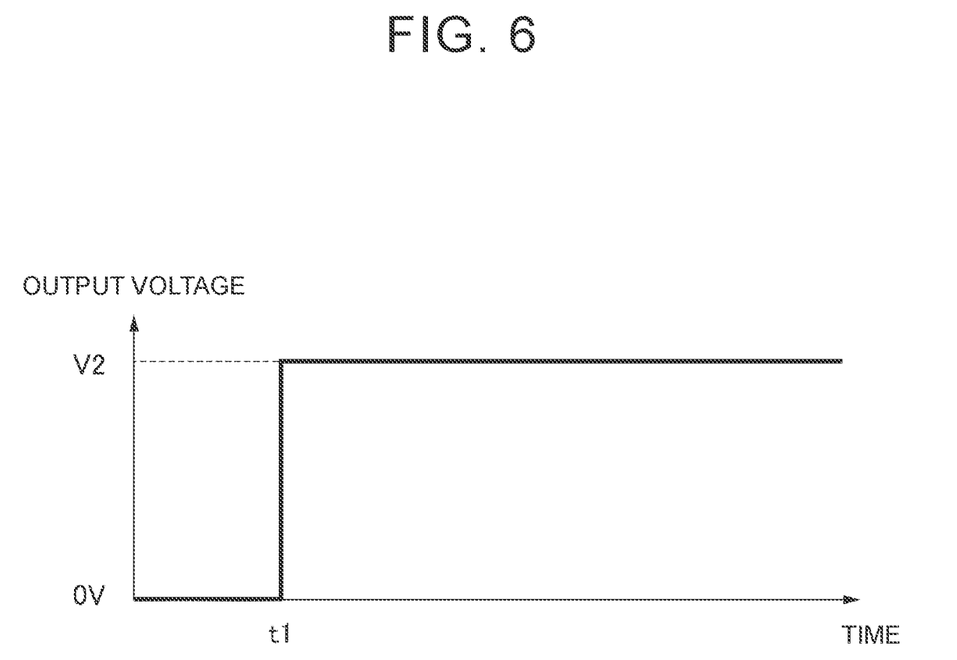
FIG. 6 is a diagram illustrating an example of a change in the output voltage at the second connection unit.

When the warm-up request from the host ECU 11 has not yet arrived, the control device 100 repeatedly executes S05 process and waits until the warm-up request arrives. When the warm-up request arrives, the process proceeds to S06. In S06, the control unit 130 starts DC control. Thereafter, DC power is supplied from the second connection unit 202 of the power converter 10 toward the heater 13, and electrically heated catalyst is heated. At this time, the potential difference between the wires 271 and 272 is maintained at a constant voltage V2 as shown in FIG. 6. The time t1 illustrated in FIG. 6 is a time at which the DC control is started. The voltage V2 when the DC control is performed may be the same as or different from the voltage V1 when the sensing control is performed.

In S07 following S06, it is determined whether or not the electric power supplied to the heater 13 after S06 has reached a predetermined target. Here, the "target value" is a value set in advance as an electric power required to raise the temperature of electrically heated catalyst to the activation temperature. The target value may be a fixed value, or may be a value that is set each time in accordance with a situation such as an outside air temperature.

When the amount of electric power supplied to the heater 13 has not yet reached the target value, the control device 100 repeatedly executes S07 process and continues the DC control.

When the amount of electric power supplied to the heater 13 becomes equal to or larger than the target value, the process proceeds to S08. In S08, the DC control by the control unit 130 is stopped. Thereafter, the processing shown in FIG. 4 is ended.

As described above, in the present embodiment, since the DC power is supplied to the heater 13 by the DC control, the heater 13 can be operated with high efficiency. In addition, it is also possible to suppress the generation of noise caused by the switching operation of the first conversion unit 210 and the like. In the detection control executed prior to the DC control, noise is generated. However, since the detection control is performed only for the minimum period necessary for the detection of the electric leakage, the noise is hardly problematic.

The DC control initiated at S06 may be the first DC control described above (FIG. 2). However, the DC control initiated at S06 may be a second DC control (FIG. 3). As described below, in the present embodiment, switching is performed between the first DC control and the second DC control in accordance with a situation during execution of the DC control.

Figure 7:
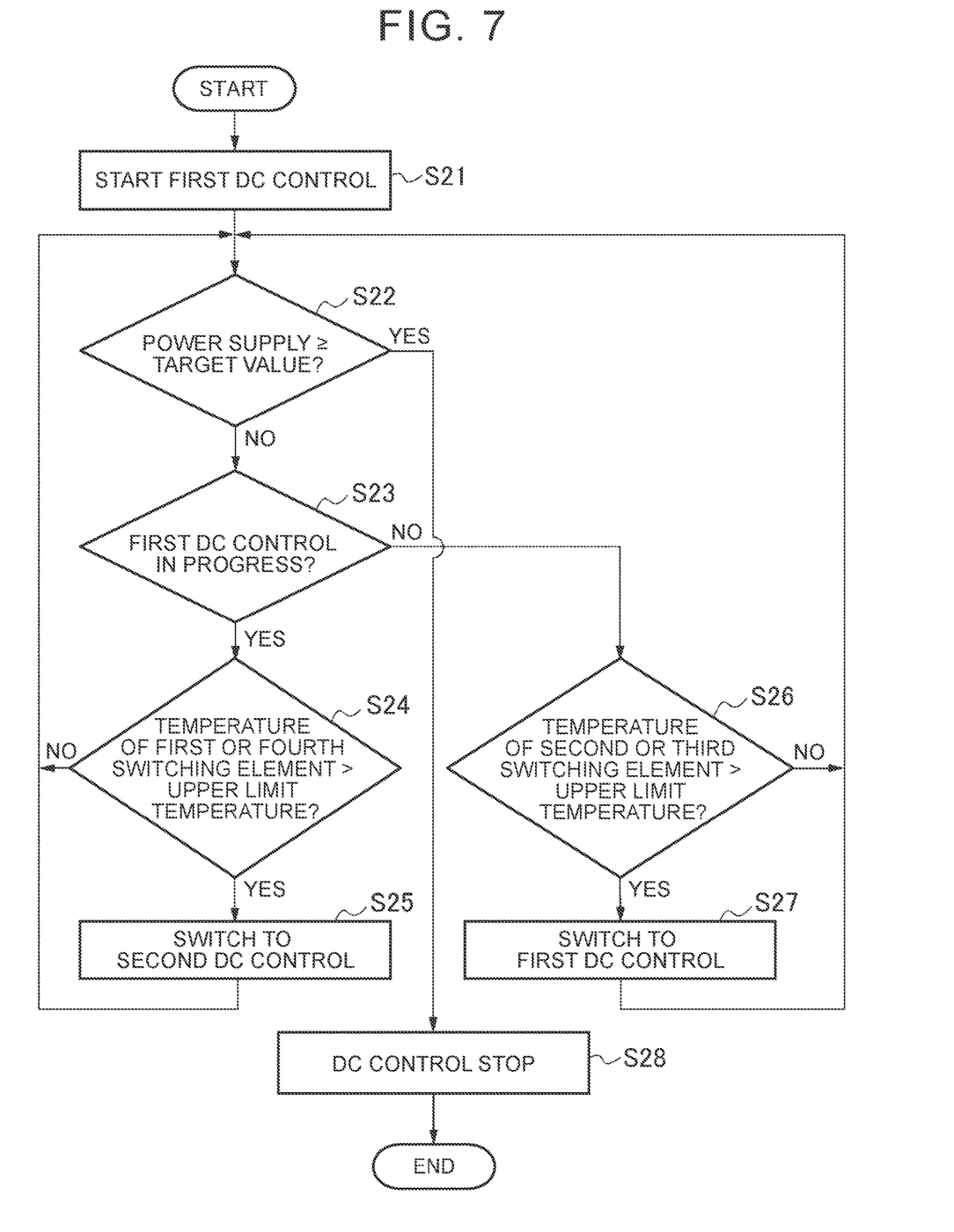
FIG. 7 is a flowchart illustrating a flow of specific processing executed by the control device in the DC control according to the first embodiment.

The flow chart shown in FIG. 7 shows a more specific flow of a process executed after S06 of FIG. 6.

When the DC control is started, first, the first DC control is started in S21. When the first DC control is performed, a current flows in a path passing through the first switching element 211 and the fourth switching element 214 as indicated by an arrow in FIG. 2. Therefore, the temperature of these two switching elements gradually increases. On the other hand, since no current flows through the second switching element 212 and the third switching element 213, the temperature of these two switching elements hardly increases.

In S22 following S21, it is determined whether or not the electric power supplied to the heater 13 after S21 has reached a predetermined target. The determination is the same as that performed in S07 of FIG. 4. When the amount of electric power reaches the target value, the process proceeds to S28, and the DC control by the control unit 130 is stopped.

In S22, when the electric power supplied to the heater 13 has not yet reached the target value, the process proceeds to S23. In S23, it is determined whether or not the DC control being performed at that time is the first DC control. When the first DC control is being executed, the process proceeds to S24.

In S24, it is determined whether or not the temperature of one of the first switching element 211 and the fourth switching element 214 (through which the current passes) exceeds a predetermined upper limit temperature. The "upper limit temperature" is a temperature set in advance as an upper limit of an appropriate temperature range such that the load of the first switching element 211 or the like does not become excessively large. When the temperatures of the first switching element 211 and the fourth switching element 214 are both equal to or lower than the upper limit temperature, the processes after S22 are executed again while the first DC control is continued. When the temperature of the first switching element 211 or the fourth switching element 214 exceeds the upper limit temperature, the process proceeds to S25.

In S25, a process of switching from the first DC control to the second DC control is performed by the control unit 130. Thereafter, S22 and subsequent processes are executed again while the second DC control is continued. After the switching to the second DC control in S25, the current does not pass through the first switching element 211 and the fourth switching element 214, and thus these temperatures gradually decrease.

When the second DC control is performed in S23, the process proceeds to S26. In S26, it is determined whether or not the temperature of one of the second switching element 212 and the third switching element 213 (through which the current passes) exceeds the upper limit temperature. The upper limit temperature used for the determination may be the same temperature as the upper limit temperature used for the determination of S24, or may be a different temperature. When the temperatures of the second switching element 212 and the third switching element 213 are both equal to or lower than the upper limit temperature, the processes after S22 are executed again while continuing the second DC control. When the temperature of the second switching element 212 or the third switching element 213 exceeds the upper limit temperature, the process proceeds to S27.

In S27, a process of switching from the second DC control to the first DC control is performed by the control unit 130. Thereafter, S22 and subsequent processes are executed again while the first DC control is continued. After switching to the first DC control in S27, current does not pass through the second switching element 212 and the third switching element 213, and thus these temperatures gradually decrease.

Figure 8:
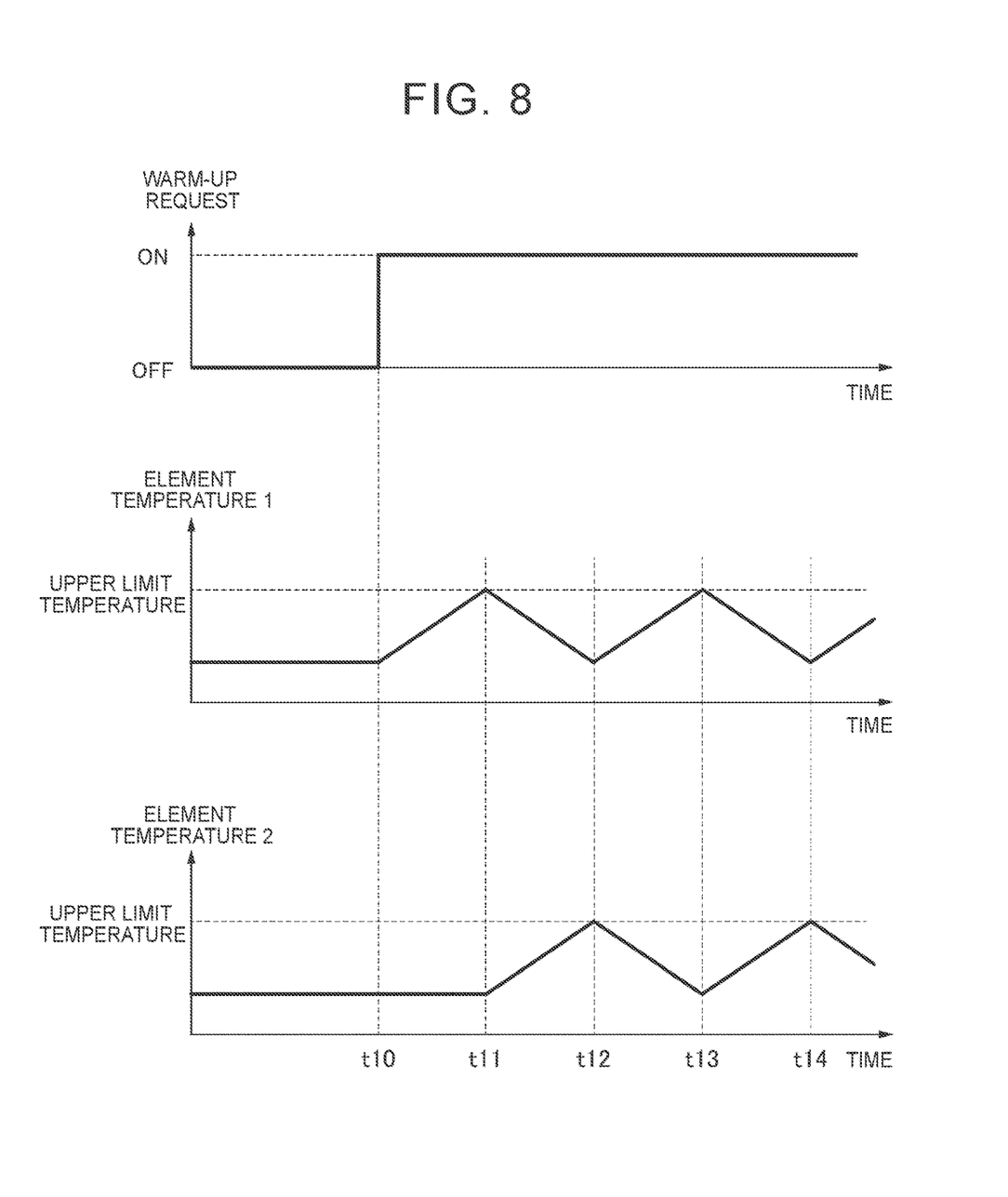
FIG. 8 is a diagram illustrating an example of a temperature change of a switching element in a case where the processing of FIG. 7 is performed.

FIG. 8 shows an example of the temperature change of the first switching element 211 and the like when the DC control is performed as described above. The "element temperature 1" in FIG. 8 refers to the temperatures of the first switching element 211 and the fourth switching element 214. The "element temperature 2" is the temperature of the second switching element 212 and the third switching element 213. Both are measured by the temperature sensors 291, 292, 293, 294 and used to determine S24, S26 of FIG. 7.

When the warm-up request is transmitted from the higher ECU 11 at the time t10, the first DC control is started, whereby the temperature (element temperature 1) of the first switching element 211 or the like gradually increases. Thereafter, when the temperature (element temperature 1) of the first switching element 211 or the like reaches the upper limit temperature at the time t11, the control is switched to the second DC control. After the time t11, the temperature (element temperature 1) of the first switching element 211 and the like gradually decreases, while the temperature (element temperature 2) of the second switching element 212 and the like gradually increases. Thereafter, when the temperature (element temperature 2) of the second switching element 212 or the like reaches the upper limit temperature at the time t12, the control is switched to the first DC control.

Thereafter, similarly, each time the temperature of the switching element reaches the upper limit temperature at the time t13, t14, the control is alternately switched between the first DC control and the second DC control.

As described above, the control unit 130 of the control device 100 according to the present embodiment performs a process of switching between the first DC control and the second DC control based on the temperature detected by the temperature sensor 291 or the like. As a result, the temperature of the conversion unit 200 (in this example, the temperature of all the switching elements included in the first conversion unit 210) can be maintained within an appropriate temperature range equal to or lower than the upper limit temperature. Since the heat resistance required for each switching element becomes low, a switching element having low heat resistance (that is, low cost) can be used as the first switching element 211 or the like.

Of the four switching elements included in the first conversion unit 210, only two switching elements are closed during the execution of the DC control, and the remaining two switching elements are in the open state, so no current flows. Since the thermal cycle applied to the individual switching elements is halved, the advantage that the heat resistance required for the switching elements is further lowered is also obtained.

Although the example of FIG. 7 is an example in which the first DC control is performed first in the DC control, the second DC control may be performed first.

Further, the process of switching between the first DC control and the second DC control is performed on the basis of the temperature measured by each of the four temperature sensors 291, 292, 293, and 294 in the present embodiment, but may be performed on the basis of only some of these temperatures.

A second embodiment is described. The present embodiment is different from the first embodiment in the content of the processing executed in the DC control. Hereinafter, differences from the first embodiment will be mainly described, and descriptions of points common to the first embodiment will be omitted as appropriate.

Figure 9:
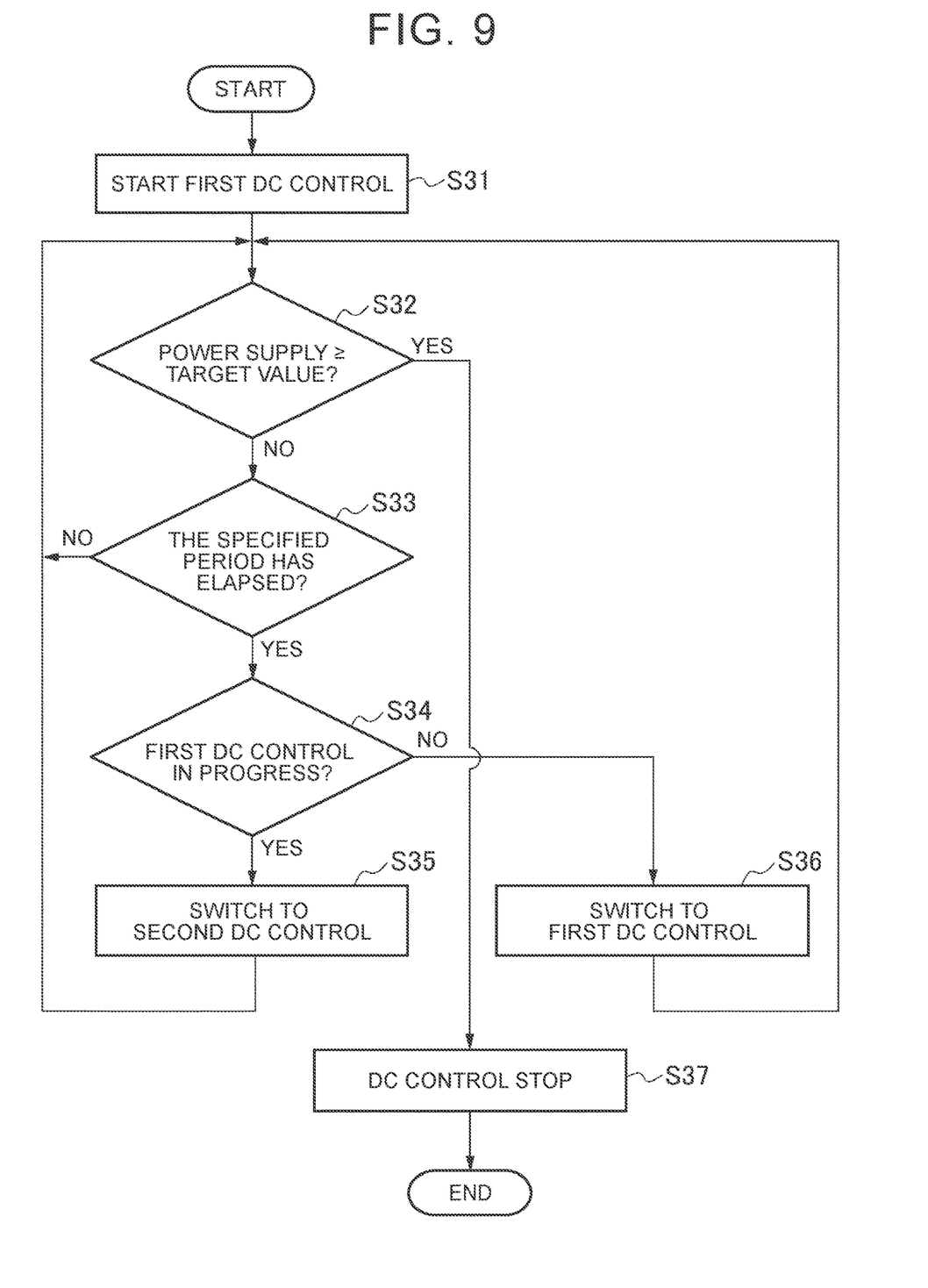
FIG. 9 is a flowchart illustrating a flow of specific processing executed by the control device in the DC control according to the second embodiment.

The series of processing illustrated in FIG. 9 is executed by the control device 100 of the present embodiment in place of the series of processing illustrated in FIG. 7. The processes performed in S31, S32 and S37 of FIG. 9 are the same as the processes performed in S21, S22 and S28 of FIG. 7, respectively.

In S32, when the electric power supplied to the heater 13 has not yet reached the target value, the process proceeds to S33 in the present embodiment. In S33, it is determined whether or not a predetermined period has elapsed since the present DC control is started. The "current DC control" as used herein refers to the DC control that is currently executed among the first DC control and the second DC control. For example, when S33 process is performed first, the first DC control started in S31 is referred to as "present DC control".

The "predetermined period" is a period of a predetermined length. In the present embodiment, the predetermined period is set as a period in which the first DC control and the second DC control can be continuously executed.

When it is determined in S33 that the predetermined period has not elapsed, the process after S32 is executed again while continuing the present DC control. If it is determined that the predetermined period has elapsed since the present DC control was started, the process proceeds to S34. In S34, it is determined whether or not the DC control being performed at that time is the first DC control. When the first DC control is being executed, the process proceeds to S35.

In S35, a process of switching from the first DC control to the second DC control is performed by the control unit 130. Thereafter, S32 and subsequent processes are executed again while the second DC control is continued.

When the second DC control is performed in S33, the process proceeds to S36. In S36, a process of switching from the second DC control to the first DC control is performed by the control unit 130. Thereafter, S32 and subsequent processes are executed again while the first DC control is continued.

As a result of the above-described processing, in the present embodiment, the control unit 130 performs processing of alternately switching between the first DC control and the second DC control as time passes. Specifically, the control unit 130 switches between the first DC control and the second DC control every time a "predetermined period" of a predetermined length elapses. If the "predetermined period" is set in advance as a period of a length such that the temperature of the first switching element 211 or the like does not exceed the upper limit temperature, the same effects as those described in the first embodiment can be obtained.

Although the example of FIG. 9 is an example in which the first DC control is performed first in the DC control, the second DC control may be performed first.

A third embodiment is described. The present embodiment is different from the first embodiment in the content of the processing executed in the DC control. Hereinafter, differences from the first embodiment will be mainly described, and descriptions of points common to the first embodiment will be omitted as appropriate.

Figure 10:
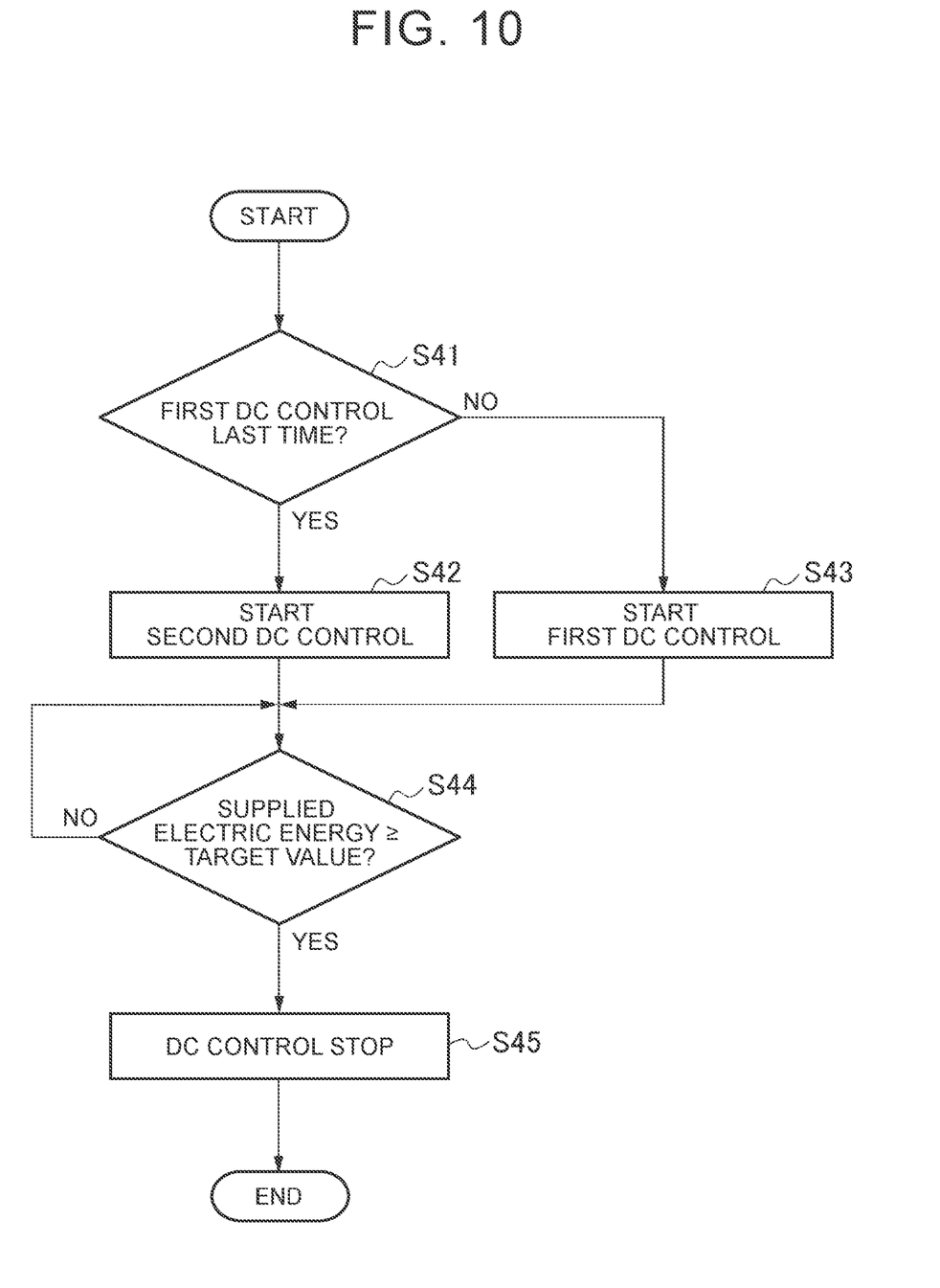
FIG. 10 is a flowchart illustrating a flow of a specific process executed by the control device in the DC control according to the third embodiment.

The series of processing illustrated in FIG. 10 is executed by the control device 100 of the present embodiment in place of the series of processing illustrated in FIG. 7. In the first S41, it is determined whether or not the DC control executed when the process of FIG. 10 was performed last time is the first DC control. In order to realize such a process, the type of DC control executed last time may be stored in a nonvolatile storage device included in the control device 100.

If the first DC control has been executed last time, the process proceeds to S42. In S42, the second DC control is started as the DC control. That is, the DC control different from the previous one is executed. Thereafter, the process proceeds to S44 described later.

In S41, if the second DC control has been executed last time, the process shifts to the process h S43. In S44, the first DC control is started as the DC control. That is, the DC control different from the previous one is executed.

After S42 or S43 process is executed, the process shifts to S44 while the DC control is continued. In S44, as in S22 of FIG. 7, a process of waiting until the electric power supplied to the heater 13 reaches the target value is performed. When the amount of electric power reaches the target value, the process shifts to S45, and the DC control by the control unit 130 is stopped.

In the present embodiment, as in the second embodiment of FIG. 9, the control unit 130 alternately switches between the first DC control and the second DC control as time elapses. In the present embodiment, each time the process of FIG. 10 is executed, the control executed as the DC control is switched between the first DC control and the second DC control. When the process illustrated in FIGS. 4 and 10 is configured to be started when the control device 100 is activated (for example, when the ignition switch of electrified vehicle is turned ON), the control unit 130 alternately switches between the first DC control and the second DC control every time the control is activated.

The present embodiment has been described above with reference to specific examples. However, the present disclosure is not limited to these specific examples. Those skilled in the art with appropriate design modifications to these specific examples are also included in the scope of the present disclosure as long as they include the features of the present disclosure. Each element included in each of the above-described specific examples and the arrangement, condition, shape, and the like thereof are not limited to those illustrated, and can be appropriately changed. Each element included in each of the above-described specific examples can be appropriately combined and changed as long as there is no technical inconsistency.

What is claimed is:

1. A power converter comprising:
   a first connection unit to which a direct current power supply is connected;
   a second connection unit to which an alternating current power supply or a power consuming device is connected;
   a conversion unit for converting power between the first connection unit and the second connection unit; and
   a control unit for controlling an operation of the conversion unit, wherein the control unit performs both:
      alternating current control for controlling the operation of the conversion unit such that alternating current power is output to the second connection unit, and
      direct current control for controlling the operation of the conversion unit such that direct current power is output to the second connection unit.

2. The power converter according to claim 1, further comprising:
   a pair of wires that is a path through which power is input and output in the second connection unit; and
   a ground fault detection unit provided in the wire, wherein the control unit performs, prior to the direct current control, detection control for controlling the operation of the conversion unit such that a potential difference between the wires changes in a rectangular wave shape.

3. The power converter according to claim 2, further comprising a determination unit that determines whether there is ground fault based on a signal output from the ground fault detection unit.

4. The power converter according to claim 1, wherein:
   the conversion unit is a circuit including a first switching element and a second switching element connected in series, and a third switching element and a fourth switching element connected in series;
   each of the first switching element and the third switching element constitutes an upper arm, and each of the second switching element and the fourth switching element includes a full bridge circuit constituting a lower arm; and
   the direct current control performed by the control unit includes both
      first direct current control in which the first switching element and the fourth switching element are each in a closed state and the second switching element and the third switching element are each in an open state, and
      second direct current control in which the second switching element and the third switching element are each in a closed state and the first switching element and the fourth switching element are each in an open state.

5. The power converter according to claim 4, further comprising a temperature detection unit for detecting a temperature of the conversion unit, wherein the control unit switches between the first direct current control and the second direct current control based on the temperature detected by the temperature detection unit.

6. The power converter according to claim 5, wherein:
   the temperature detection unit detects a temperature of at least one of the first switching element, the second switching element, the third switching element, and the fourth switching element; and
   the control unit
      switches from the first direct current control to the second direct current control, when the first direct current control is performed, and a temperature of the first switching element or the fourth switching element exceeds a predetermined upper limit temperature, and
      switches from the second direct current control to the first direct current control, when the second direct current control is performed, and a temperature of the second switching element or the third switching element exceeds the predetermined upper limit temperature.

7. The power converter according to claim 4, wherein the control unit switches between the first direct current control and the second direct current control over time.

8. The power converter according to claim 7, wherein the control unit switches between the first direct current control and the second direct current control every time a predetermined period elapses.

9. The power converter according to claim 7, wherein the control unit switches between the first direct current control and the second direct current control every time the control unit is activated.

* * * * *